No. 728,055. PATENTED MAY 12, 1903.
J. WALKER.
HEDDLE FOR LOOMS.
APPLICATION FILED JAN. 24, 1902.
NO MODEL.

No. 728,055. Patented May 12, 1903.

UNITED STATES PATENT OFFICE.

JOHN WALKER, OF PHILADELPHIA, PENNSYLVANIA, ASSIGNOR TO CHARLES ASHOFF WEAVERS' SUPPLY COMPANY, OF PHILADELPHIA, PENNSYLVANIA, A FIRM COMPOSED OF CHARLES ASHOFF AND JOHN WALKER AND TRADING AS SUCH.

HEDDLE FOR LOOMS.

SPECIFICATION forming part of Letters Patent No. 728,055, dated May 12, 1903.

Application filed January 24, 1902. Serial No. 91,115. (No model.)

*To all whom it may concern:*

Be it known that I, JOHN WALKER, a citizen of the United States, residing in the city and county of Philadelphia, State of Pennsylvania, have invented new and useful Improvements in Wire Heddles for Looms, of which the following is a specification.

My invention consists of a heddle having loops which are reinforced or strengthened and guard the ends of the material of which they are composed within themselves in a manner as will be hereinafter described and the novel features pointed out in the claims.

Figure 1:
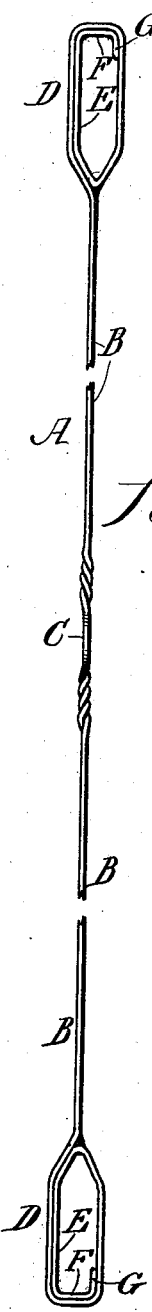
Figure 2:

Figure 1 represents a side elevation of a loom-heddle embodying my invention. Fig. 2 represents a side elevation at a right angle to that shown in Fig. 1.

Similar letters of reference indicate corresponding parts in the figures.

Referring to the drawings, A designates a wire heddle, which consists of the body B, the central eye C, and end loops D and in the present case is composed of two lengths of material placed side by side. The loops are formed each by bending the end portion of the material of which the heddle is formed on itself into the shape of a loop, then continuing the material along within the loop on one side of the same, as at E, then along and around the outer end of the loop, as at F, and finally along the opposite side, as at G, the contiguous parts being soldered or welded or otherwise firmly secured together as one. By this provision the loops have their walls reinforced and vastly strengthened, as they present a plurality of members or walls, especially at the outer ends of the loops, where the latter are subjected to severe usage and strain. Furthermore, twists at the places of connection of the body and loops are obviated. Furthermore, the ends of the wire or material are on the inner sides of the loop, whereby they are guarded, so as not to present or expose any sharp or cutting edges on the exterior of the heddle, the advantages of which are evident.

Having thus described my invention, what I claim as new, and desire to secure by Letters Patent, is—

1. A heddle having a loop and a reinforce for the same at the outer end thereof, the same consisting of the material of said loop continuous of itself around the same and across said end.

2. A heddle having a loop and a reinforce for the same at the outer end thereof, the same consisting of the material of the loop continuous of itself along the inner end, a side and said outer end.

JOHN WALKER.

Witnesses:
JOHN A. WIEDERSHEIM,
C. D. McVAY.